A. R. SCHOLIN.
PACKAGE WRAPPING MACHINE.
APPLICATION FILED APR. 24, 1913.
1,171,358.
Patented Feb. 8, 1916.
14 SHEETS—SHEET 7.
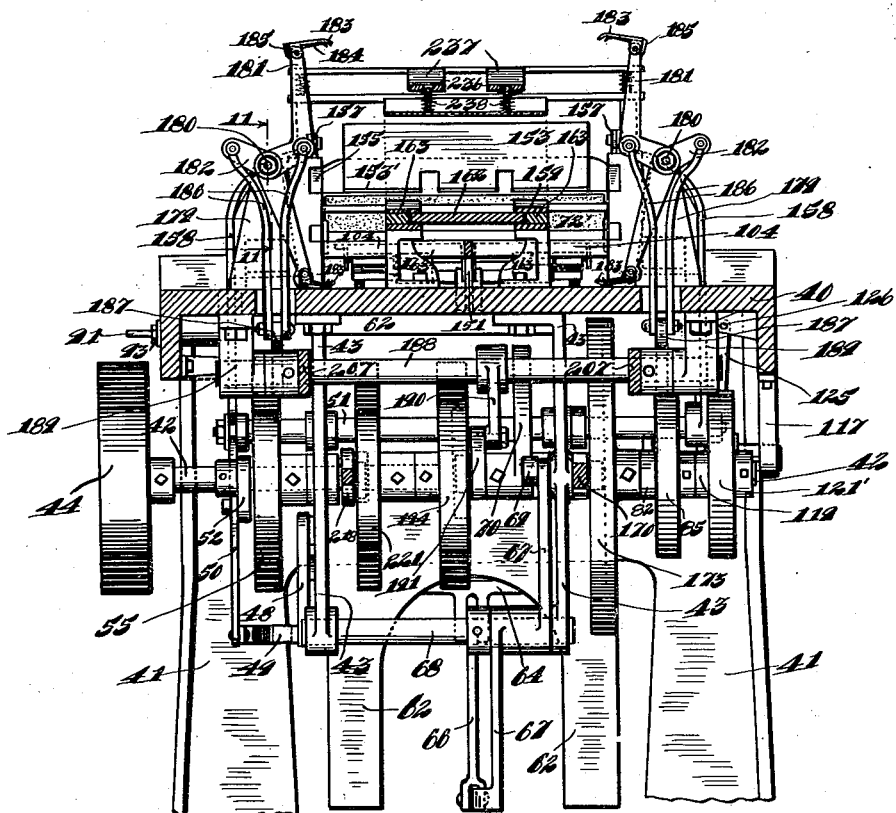
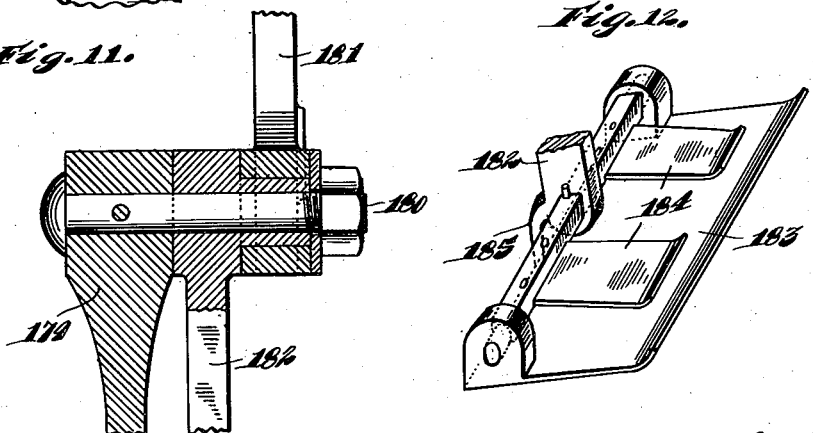
Witnesses:
C. E. Vessels.
A. A. Olson.
Inventor:
Axel R. Scholin,
By Joshua R. H. Potts
his Attorney.

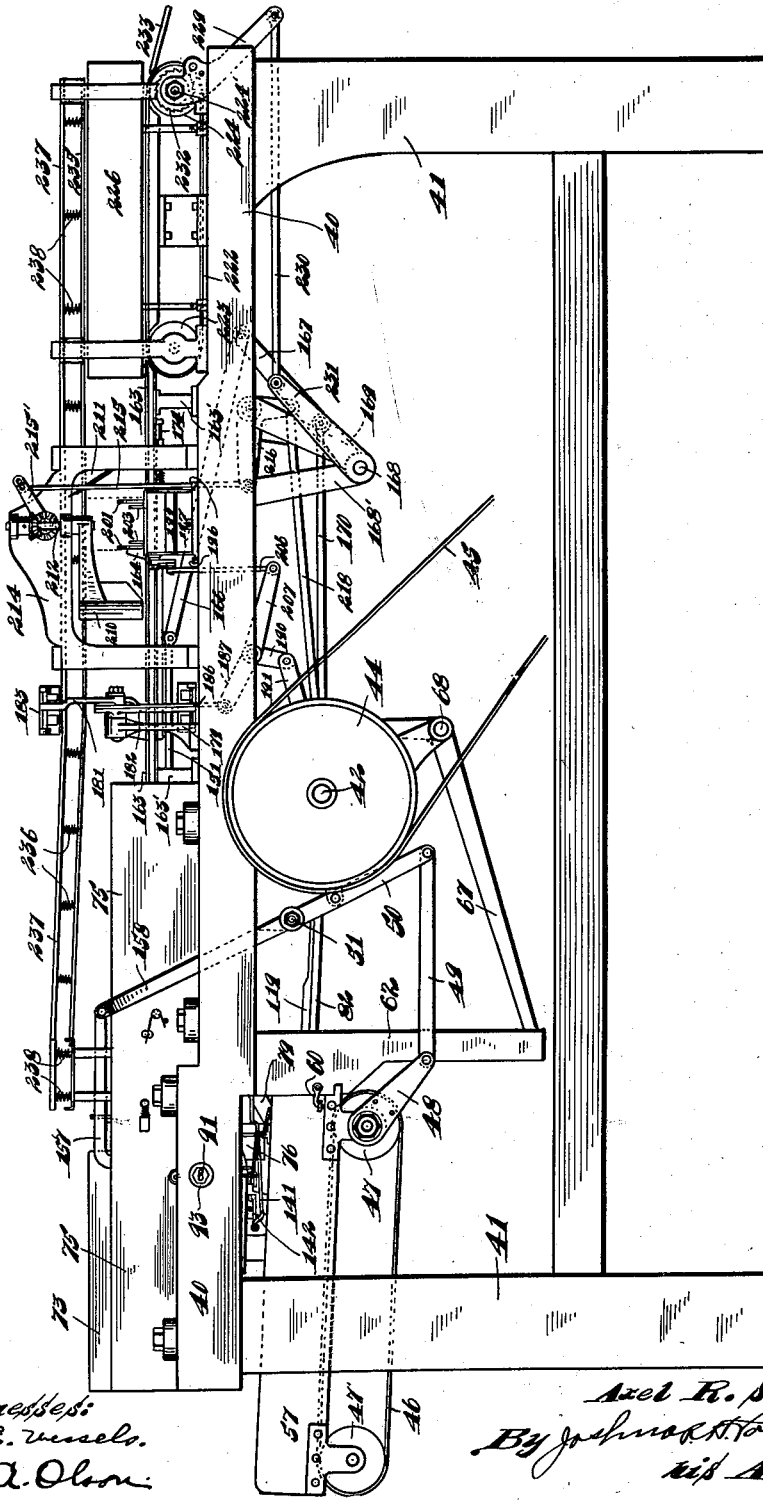

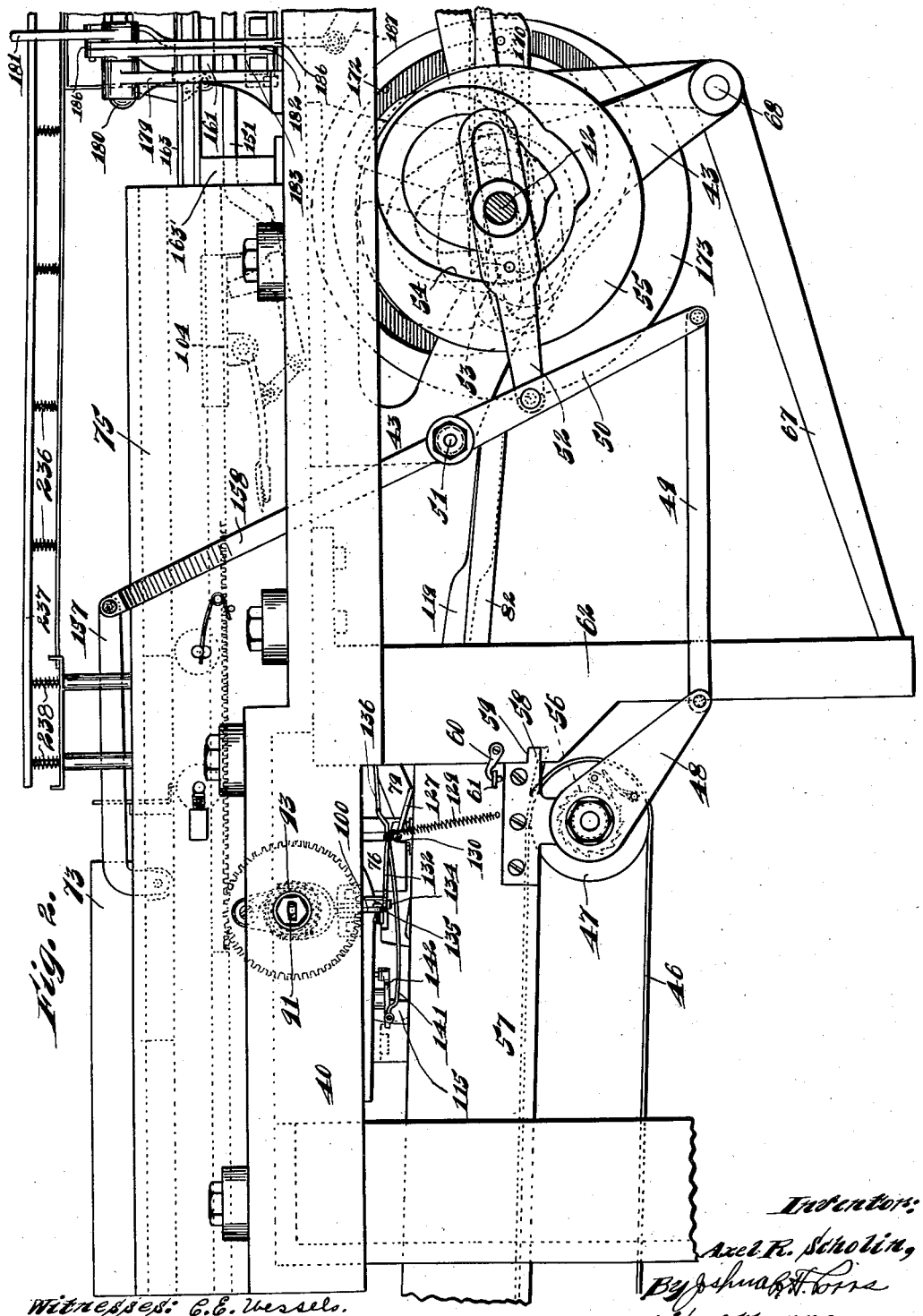

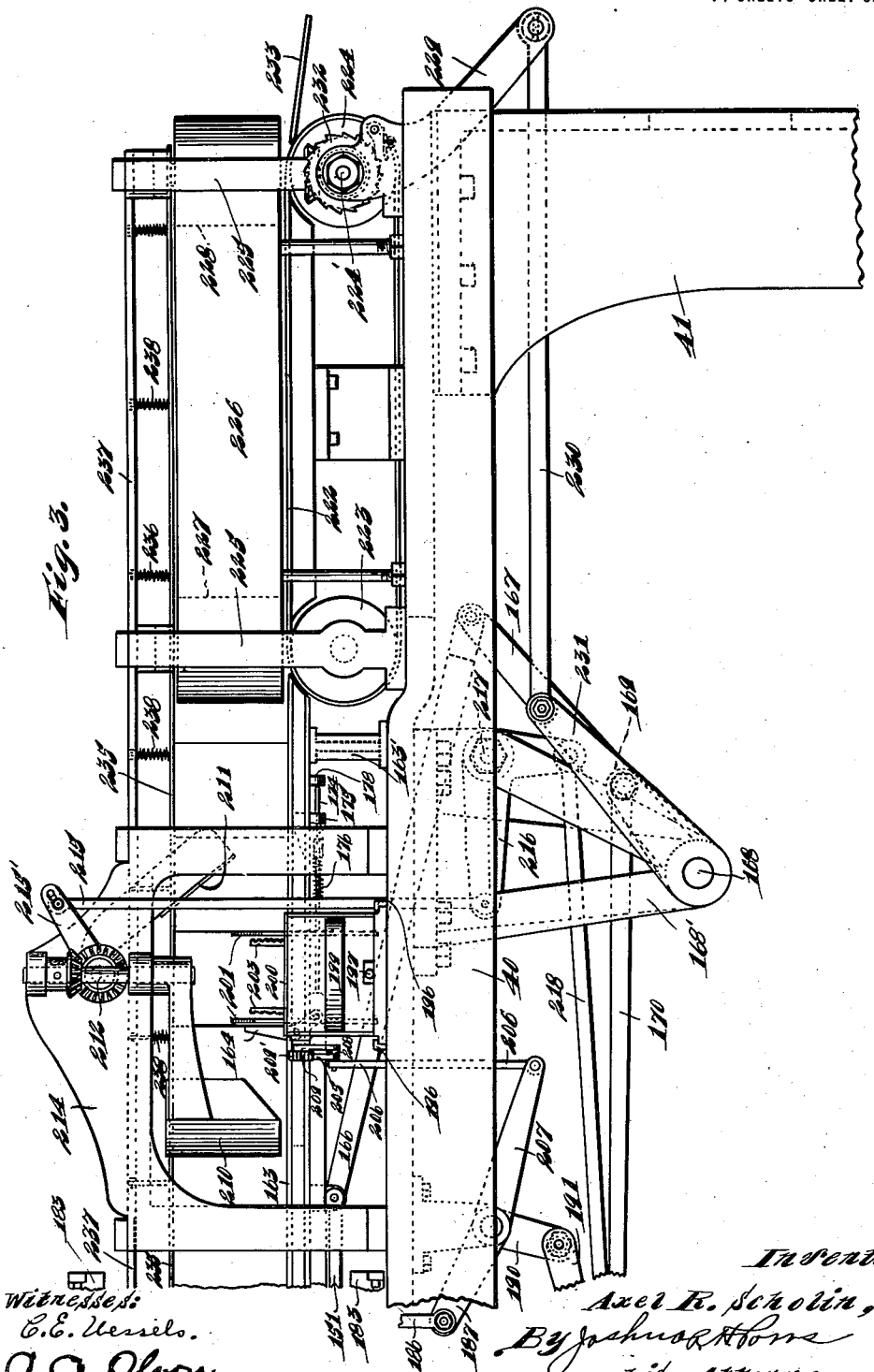

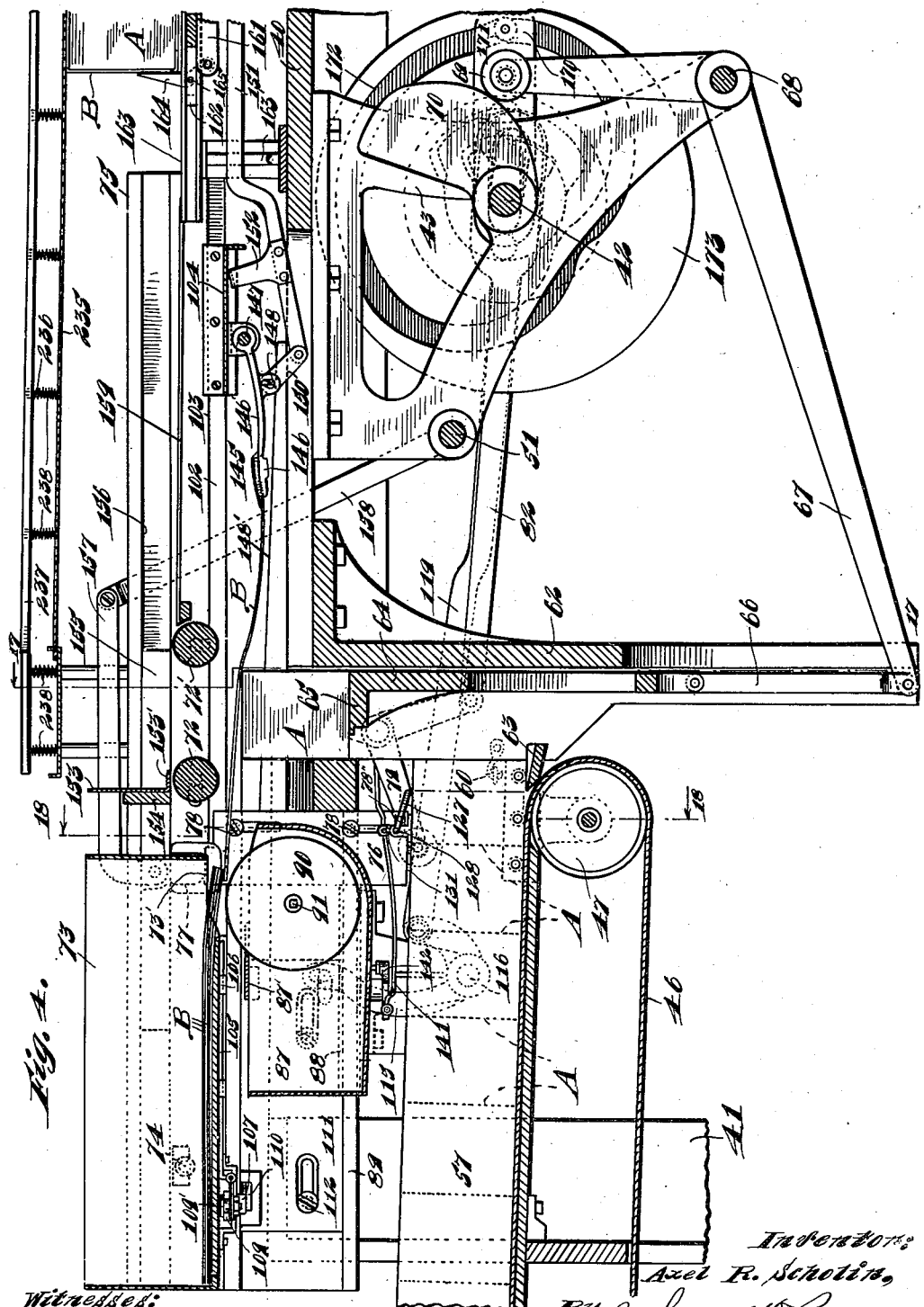

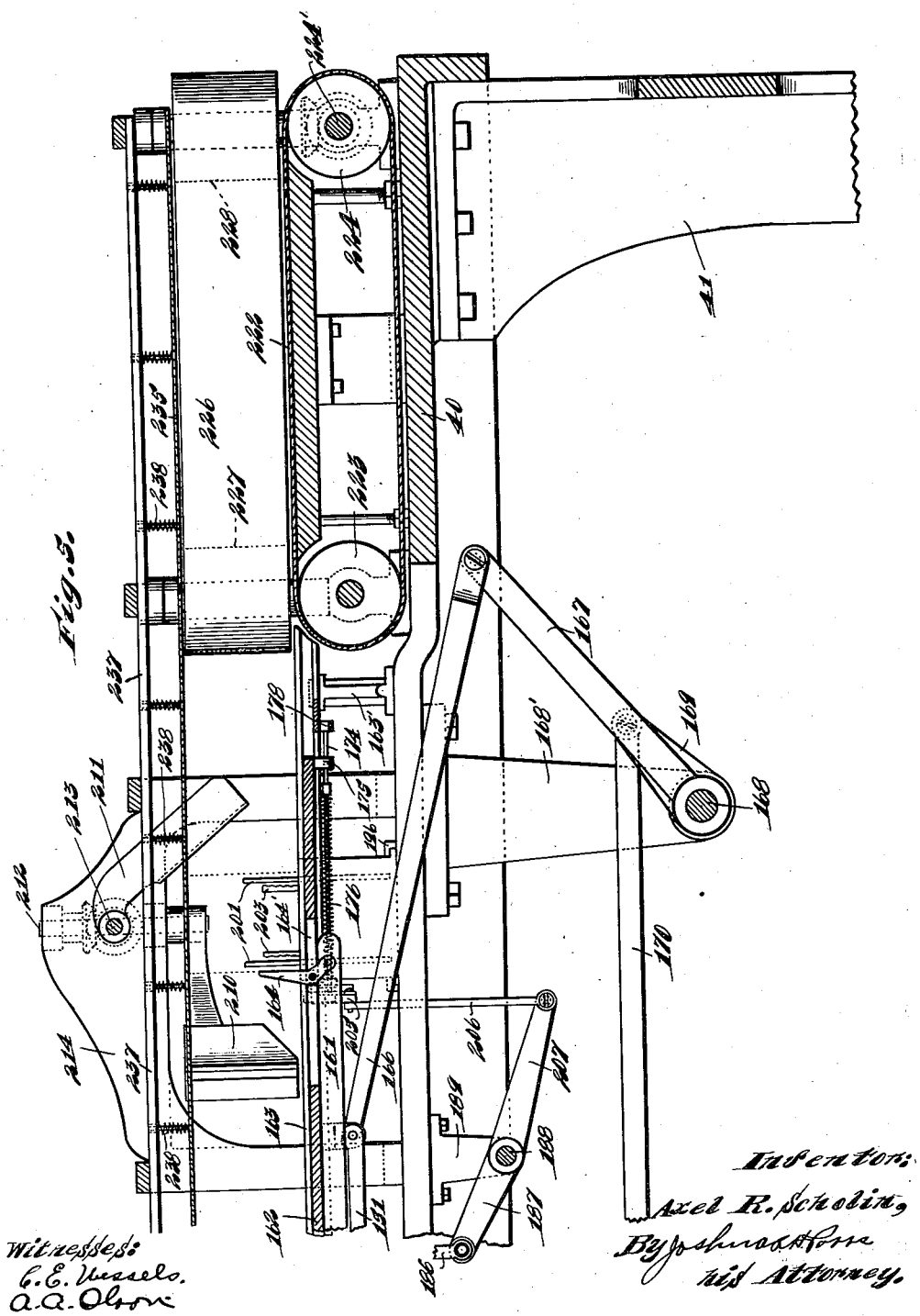

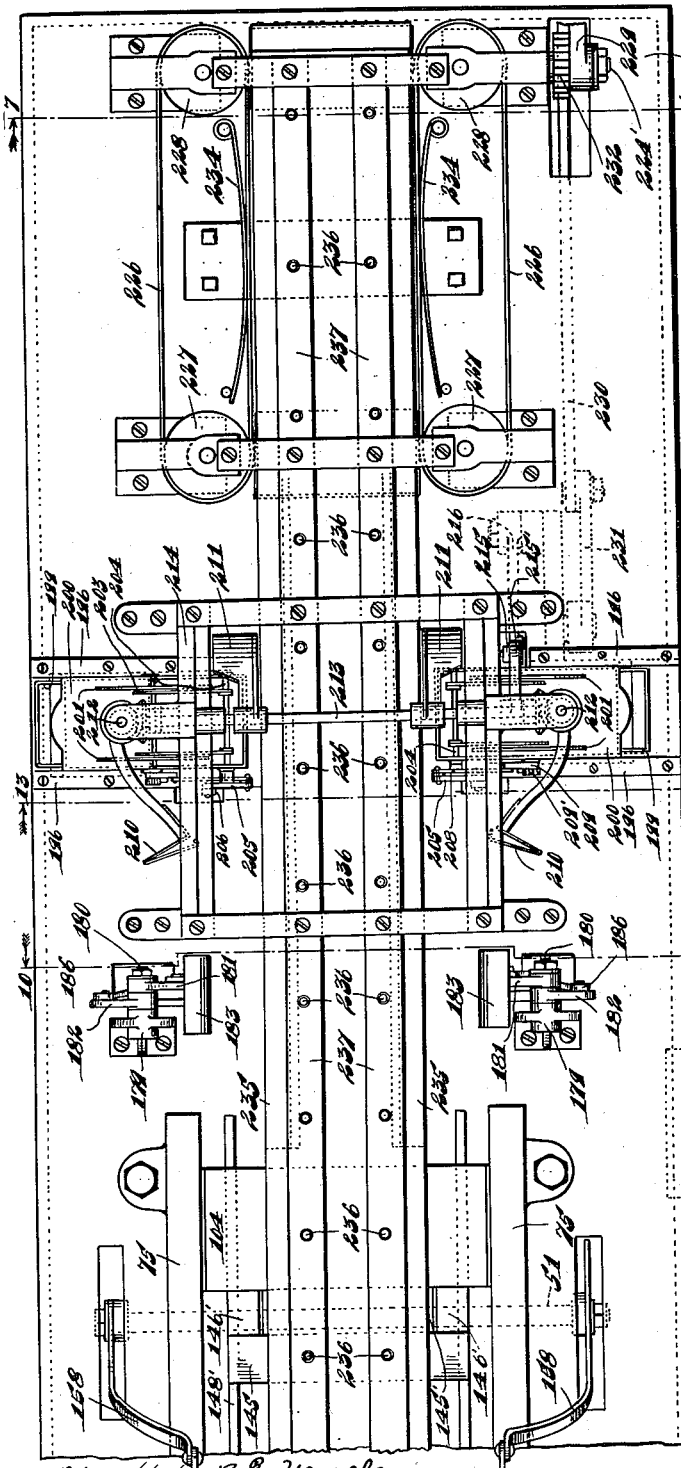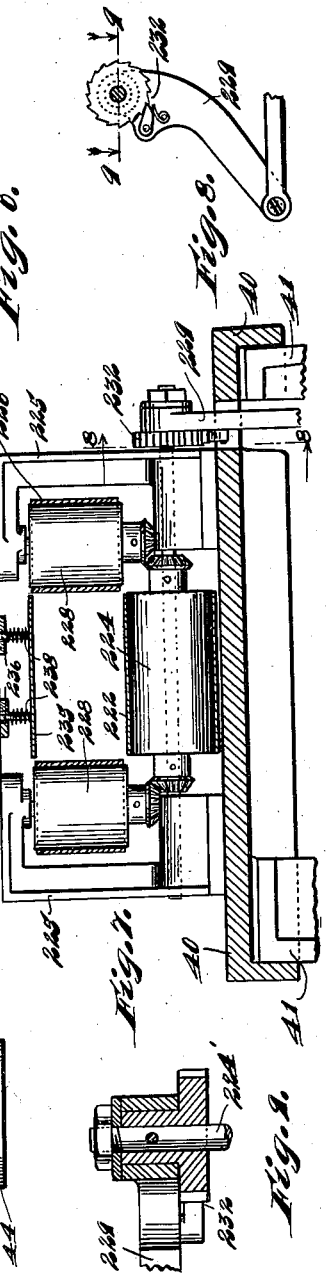

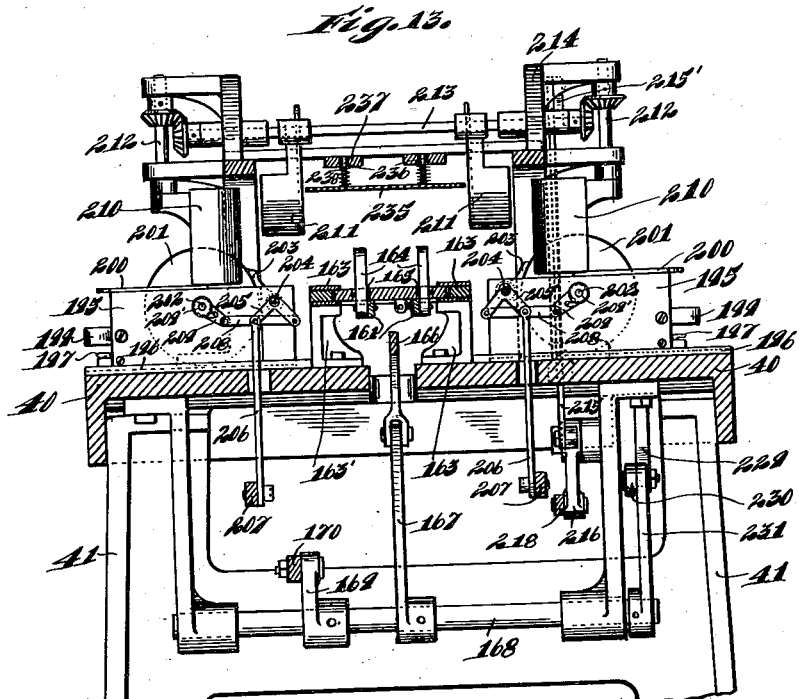
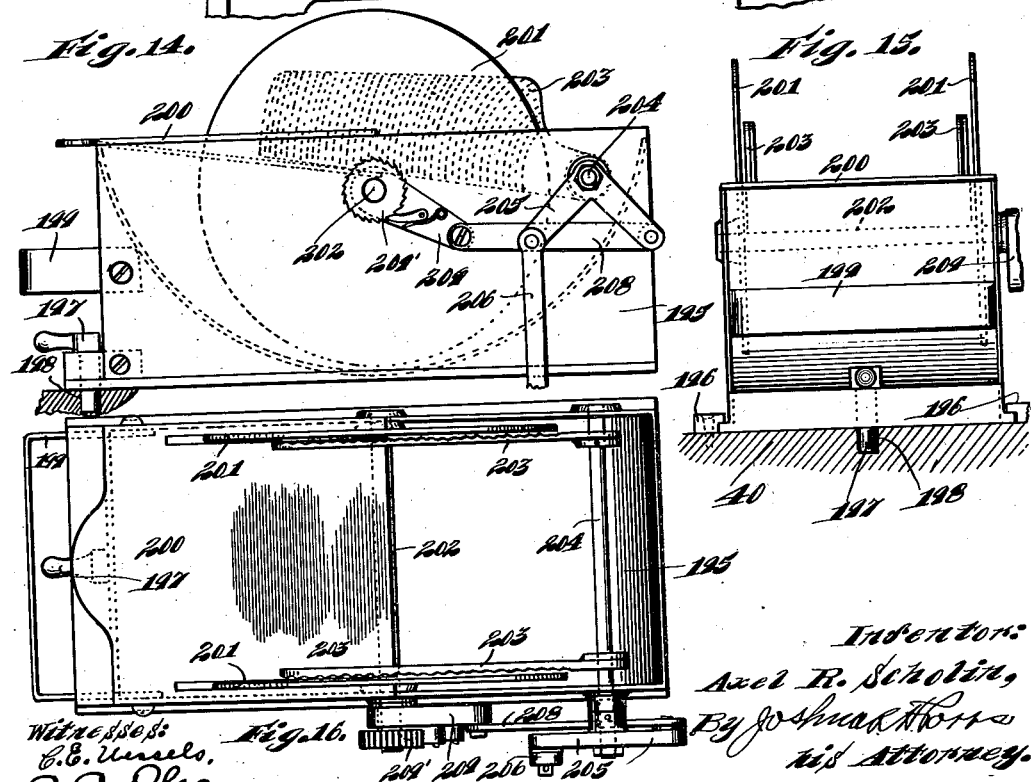

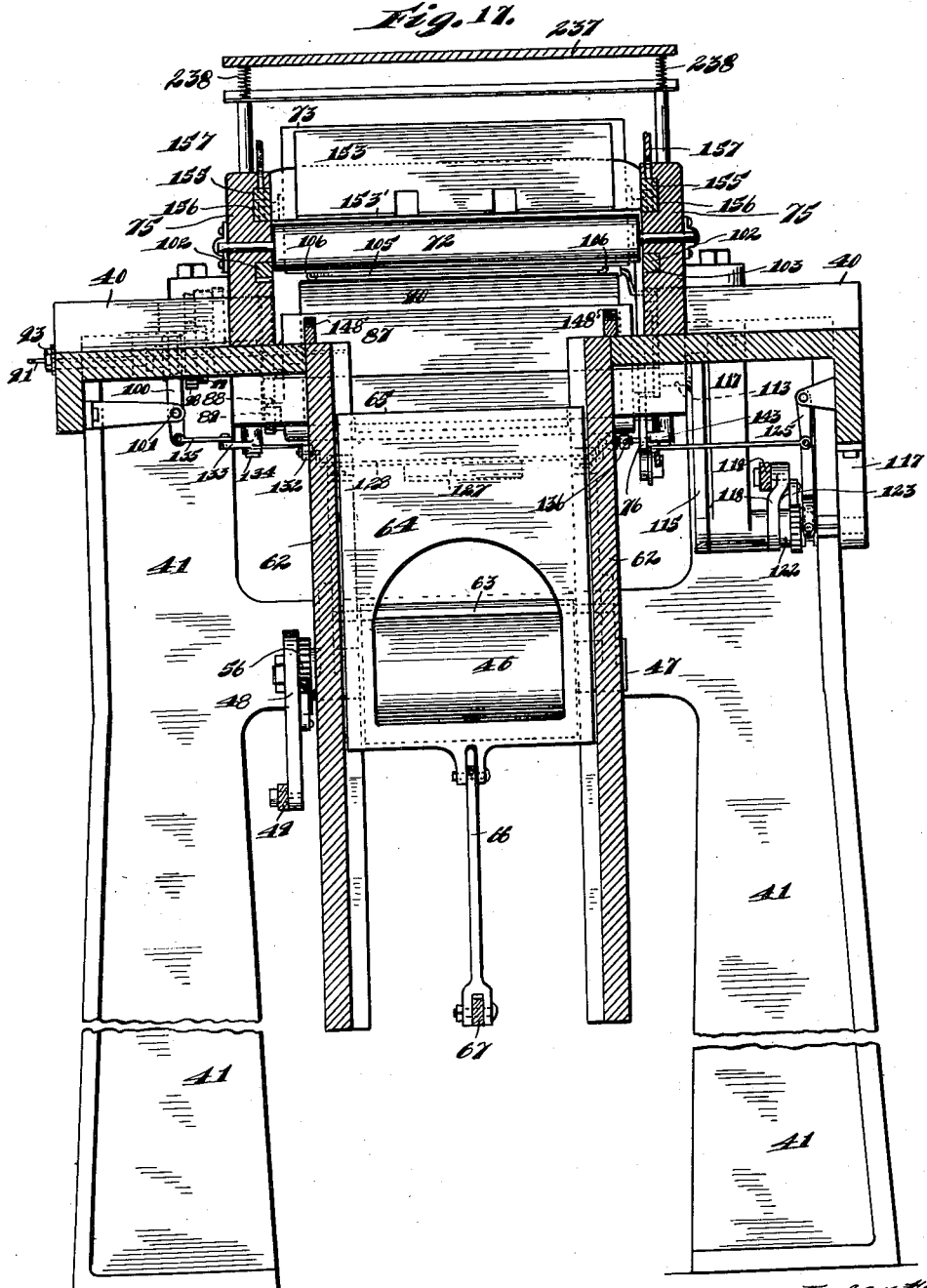

A. R. SCHOLIN.
PACKAGE WRAPPING MACHINE.
APPLICATION FILED APR. 24, 1913.
1,171,358.
Patented Feb. 8, 1916.
14 SHEETS—SHEET 10.
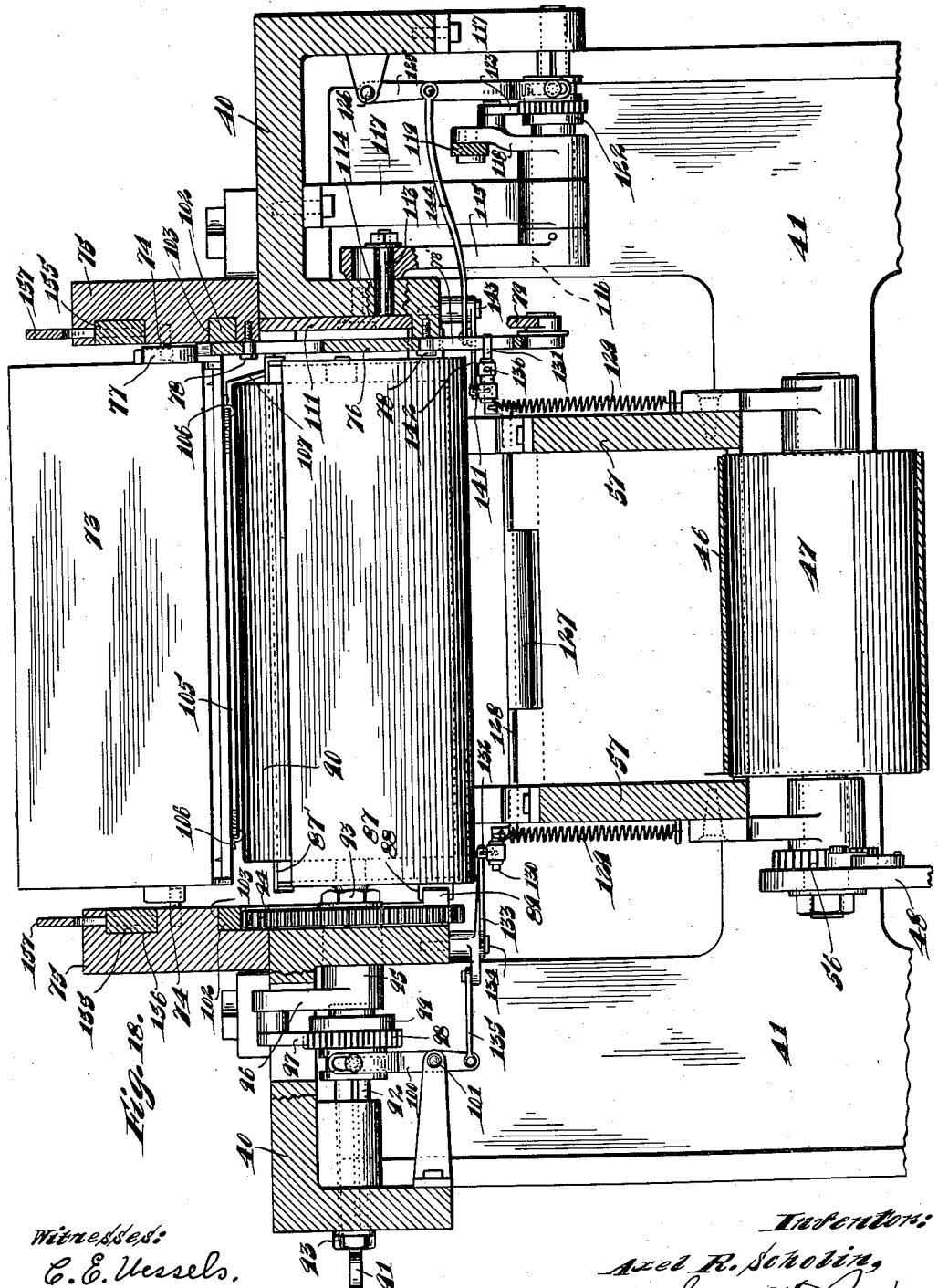

A. R. SCHOLIN.
PACKAGE WRAPPING MACHINE.
APPLICATION FILED APR. 24, 1913.
1,171,358.
Patented Feb. 8, 1916.
14 SHEETS—SHEET 11.
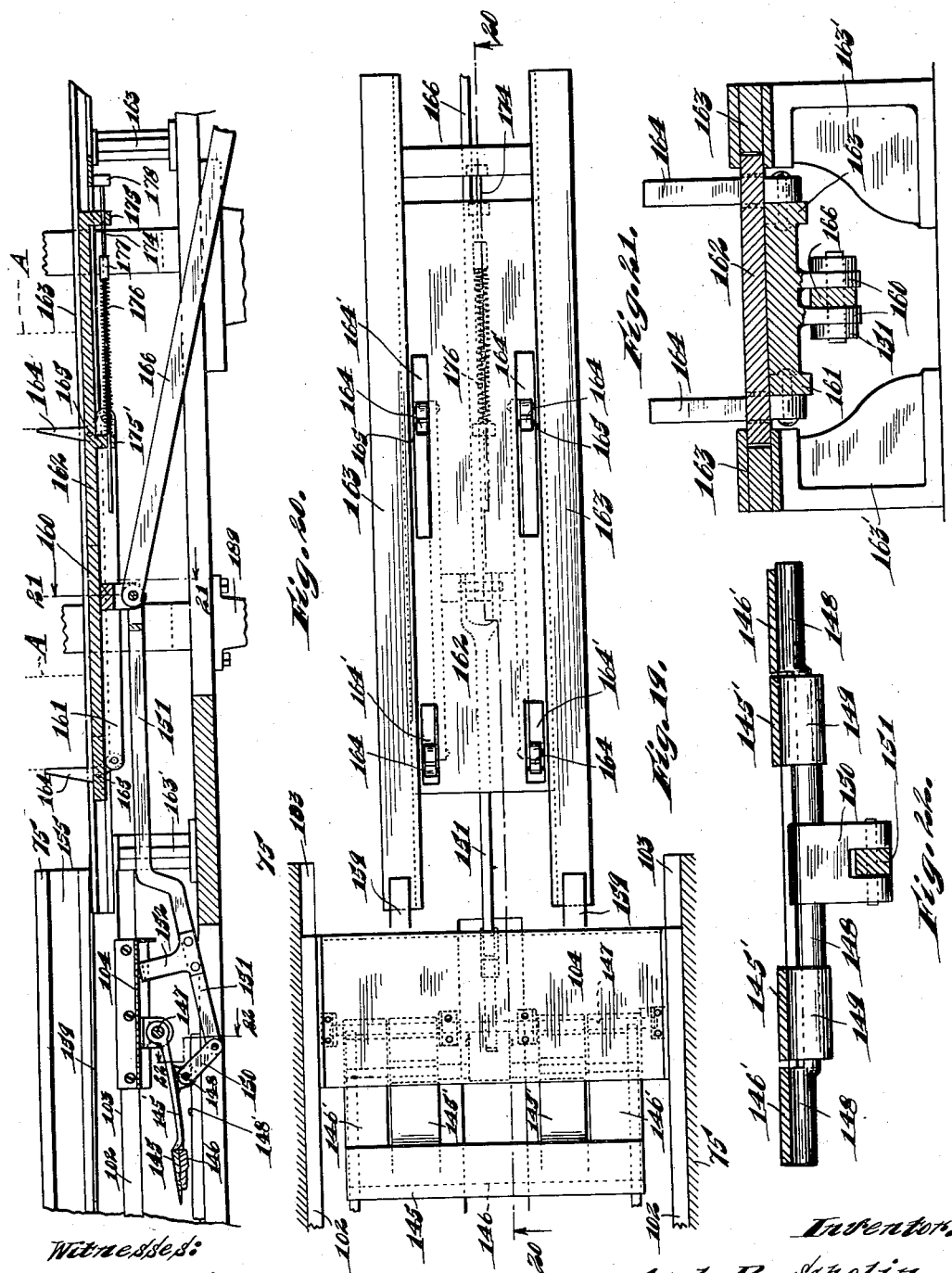

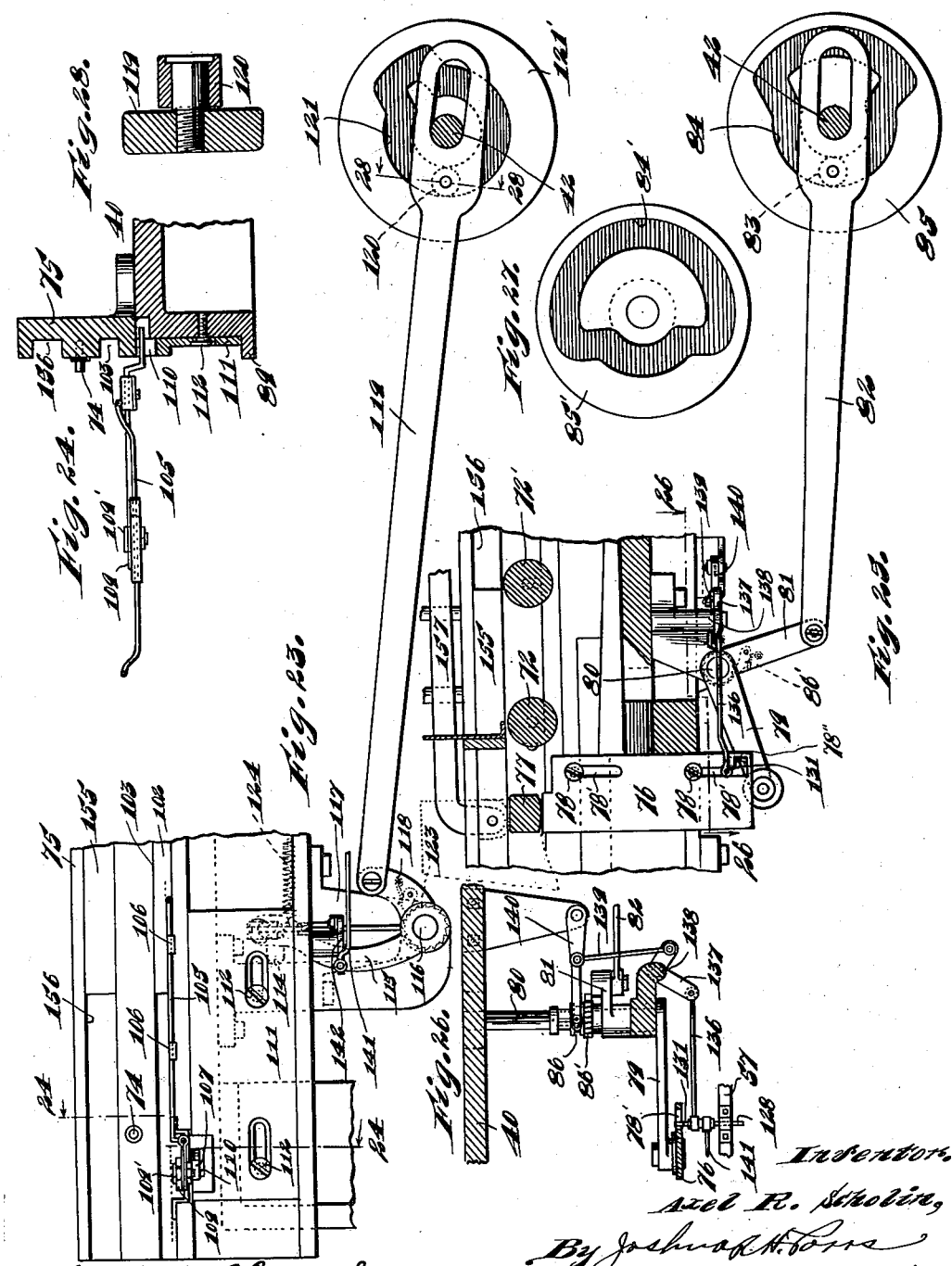

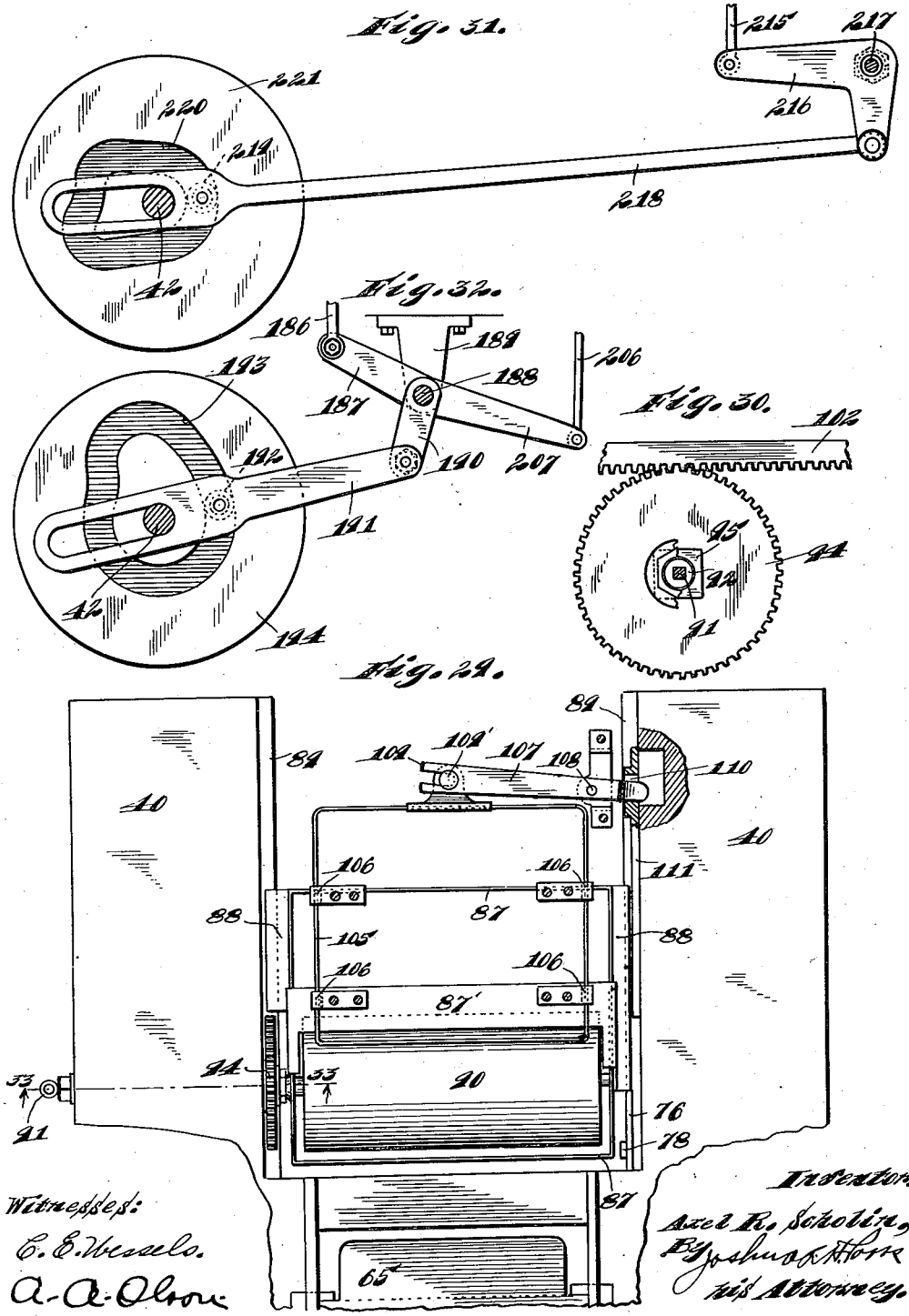

A. R. SCHOLIN.
PACKAGE WRAPPING MACHINE.
APPLICATION FILED APR. 24, 1913.
1,171,358.  Patented Feb. 8, 1916.
14 SHEETS—SHEET 14.
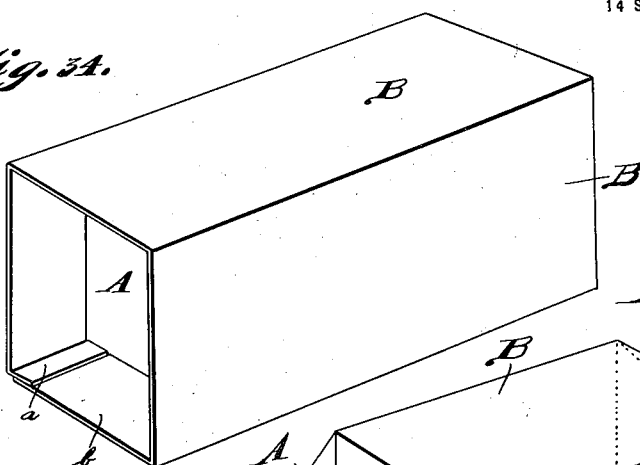
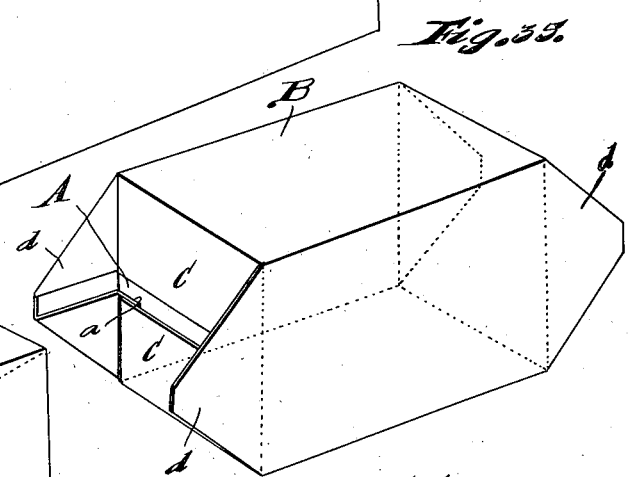
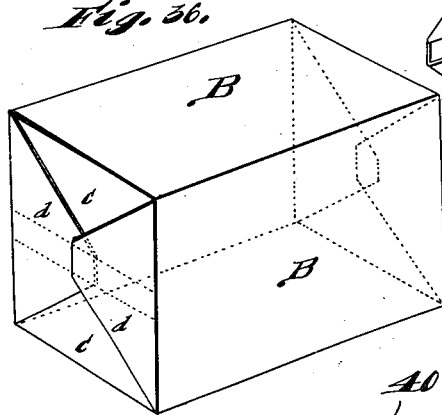
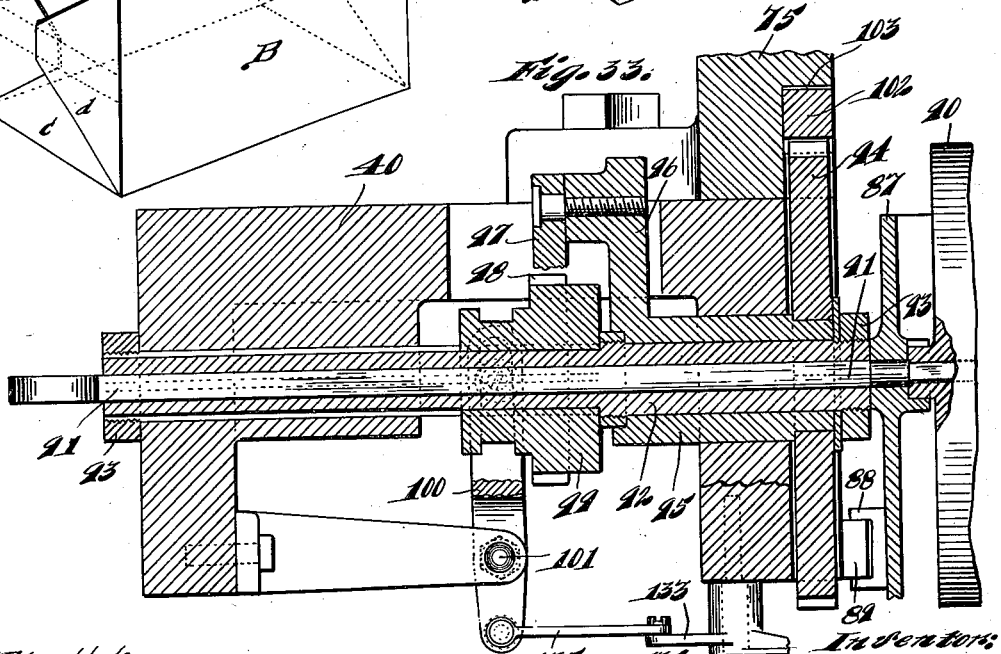
Witnesses:
C. E. Vessels.
A. A. Olson.
Inventor:
Axel R. Scholin,
By Joshua R. H. Potts
his Attorney.

UNITED STATES PATENT OFFICE.

AXEL R. SCHOLIN, OF CHICAGO, ILLINOIS.

PACKAGE-WRAPPING MACHINE.

1,171,358.  Specification of Letters Patent.  Patented Feb. 8, 1916.

Application filed April 24, 1913. Serial No. 763,278.

*To all whom it may concern:*

Be it known that I, AXEL R. SCHOLIN, a citizen of the United States, and a resident of the city of Chicago, county of Cook, and State of Illinois, have invented certain new and useful Improvements in Package-Wrapping Machines, of which the following is a specification.

My invention relates to improvements in package wrapping machines and has for its object the production of a machine of this character which will be of improved construction and efficient in operation.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of a package wrapping machine embodying my invention, Fig. 2 is an enlarged side elevation of the front end portion of the machine, Fig. 3 is a view similar to Fig. 2 of the rearward portion of the machine, Figs. 4 and 5 are vertical longitudinal sections of the constructions shown in Figs. 2 and 3 respectively, Fig. 6 is a top plan view of the rearward portion of the machine, Fig. 7 is a vertical transverse section taken on substantially line 7—7 of Fig. 6, Fig. 8 is a detail of a portion of the construction shown in Fig. 6, Fig. 9 is an enlarged detail section taken on line 9—9 of Fig. 8, Fig. 10 is a vertical transverse section taken on substantially line 10—10 of Fig. 6, Fig. 11 is an enlarged sectional detail taken on line 11—11 of Fig. 10, Fig. 12 is an enlarged detail perspective view of one of the folding members shown in Fig. 10, Fig. 13 is a vertical transverse section taken on substantially line 13—13 of Fig. 6, Fig. 14 is a side elevation of one of the paste applying devices employed in the machine, detached, Fig. 15 is an end elevation thereof, Fig. 16 is a top plan view of the same, Fig. 17 is a vertical transverse section taken on substantially line 17—17 of Fig. 4, Fig. 18 is an enlarged vertical transverse section taken on substantially line 18—18 of Fig. 4, Fig. 19 is a detail top plan view of the wrapper-removing and package advancing means of the machine, Fig. 20 is a vertical longitudinal section taken on substantially line 20—20 of Fig. 19, Figs. 21 and 22 are enlarged sections taken on substantially lines 21—21 and 22—22 respectively of Fig. 20, Fig. 23 is a fragmentary detail illustrating the mechanism employed for effecting disengagement of the front edge of the wrapper from the paste applying roller, Fig. 24 is a section taken on substantially line 24—24 of Fig. 23, Fig. 25 is a fragmentary sectional detail illustrating the mechanism for effecting vertical movement of the front end of the wrapper magazine, Fig. 26 is a section taken on substantially line 26—26 of Fig. 25, Fig. 27 is a front elevation of a cam which may be used in lieu of the cam shown in Fig. 25, the cam shown in Fig. 27 being designed for use where it is desired to apply paste only to the end portions of one side of the wrapper, the cam shown in Fig. 25 being used where it is desired to entirely cover one side of the wrapper with paste, Fig. 28 is an enlarged detail section taken on line 28—28 of Fig. 23, Fig. 29 is a top plan view, partially in section, of the forward portion of the machine, the wrapper magazine being removed to expose underlying parts, Fig. 30 is an enlarged detail of a portion of the construction shown in Fig. 29, Figs. 31 and 32 are detail side elevations illustrating certain cam operating mechanisms of the machine, Fig. 33 is an enlarged detail section taken on line 33—33 of Fig. 29, and Figs. 34, 35 and 36 are perspective views illustrating the various stages of the wrapping operation.

The preferred form of construction as illustrated in the drawings comprises a table or supporting frame consisting of a top 40 and supporting legs 41. Arranged below the table top 40 substantially midway the extremities thereof is a transversely extending shaft 42 mounted in suitable bearing brackets 43 which depend from said table top. At one end of the shaft 42 is provided a pulley 44 around which passes an endless belt 45 for effecting driving of the machine, the belt 45 being driven through the medium of any suitable power supply such as a motor or the like.

Arranged at the front end of the table below the top 40 is a receiving mechanism or or trough into which the packages are deposited in the introduction thereof into the machine for wrapping. This trough comprises an endless belt 46 which travels around rollers 47 and 47′. The roller 47 is intermittently rotated to effect intermittent feeding of the packages by the belt 46 by means of a rocker arm 48 which is connected at its outer end by means of a link 49 with the lower end of a rocker arm 50 fixed at its upper end to a transversely extending shaft 51 mounted in the bearing brackets 43. Connected with the arm 50 is a link 52 which carries a roller 53 which engages an irregular cam groove 54 provided in a cam disk 55 which is fixed to the shaft 42. The free end of the link 52 is provided with an elongated slot, as clearly shown in Fig. 2, which loosely engages the shaft 42, the latter thereby serving as a means of retaining said end of said link in operative position, permitting of longitudinal movement thereof such as is incidental to rotation of the cam 55. With this arrangement it will be seen, that upon rotation of the cam disk 55, the rocker arm 50 will be oscillated causing corresponding movement of the rocker arm 48. The rocker arm 48 is operatively connected with the roller 47 through the medium of a conventional pawl-and-ratchet mechanism 56 so that upon oscillation of the arm 48 the belt 46 will be intermittently moved in only one direction, as will be readily understood. The bottom of the package receiving trough is constituted by the upper side of the belt 46, the sides of the trough being formed by spaced elongated members 57 which are rigidly connected and from the respective extremities of which depend bearings for the rollers 47 and 47' as illustrated. The trough is removably supported in position by a tongue 58 provided at the inner end thereof which engages a slot 59 provided in a channel member 62 which depends from the under side of table top 40, hooks or latches 60 provided at the opposite sides of the member 62 releasably engaging eyes 61 provided at the outer sides of the corresponding ends of the members 57 to releasably lock the trough in position, as will be readily understood. With this arrangement, it will be seen, that if desired or if it becomes necessary to disconnect the trough in order to afford access to other parts of the mechanism for adjustment or repair, it is only necessary to disconnect the link 49 from the arm 48 and then to release the hooks or latches 60.

In the operation of the machine the packages introduced to the receiving trough will be conveyed inwardly in the latter by the belt 46 until said packages abut the adjacent side of the member 62, a plate 63 being provided at the inner bight of the belt to prevent the packages falling through the space intervening the roller 47 and the member 62.

Mounted for vertical sliding in the member 62 is a package elevating member 64 provided at its upper end with a horizontally extending flange or ledge 65. The flange 65, when the member 64 is at its lower terminal of movement, will be positioned below the plate 63 and so that upon upward movement of said member 64, the innermost package, or that which is positioned in proximity with the member 62 will be engaged by the flange 65 and carried upwardly thereby, as clearly shown in Fig. 4, a package A being shown positioned upon said flange. Vertical reciprocation of the member 64 as mentioned, is effected through the medium of a link 66 pivotally connected at its upper end with the lower extremity of said member 64, the lower terminal of said link being connected with one end of a bell crank lever 67 which is fulcrumed at 68. The other extremity of the lever 67 is provided with a roller 69 which contacts with the periphery of a cam 70 fixed to the shaft 42. The arrangement is such that, upon rotation of said cam, the bell crank lever 69 will be oscillated to effect vertical reciprocation of the package elevating member 64, as desired. The amplitude of reciprocation of the member 64 is such that a package A elevated thereby will be passed or forced between two spaced spring-pressed rollers 72 and 72', as clearly shown in Fig. 4.

Arranged at the forward end of the table is a rectangular wrapper magazine 73 open at its upper side, said magazine being adapted to accommodate a large number or plurality of wrappers arranged one above the other in stack form. The rearward end of the magazine 73 is pivotally supported upon inwardly projecting pins 74 secured to elongated frame members 75 which are secured rigidly to the table top 40, as clearly shown in Figs. 4 and 18. The front end of the magazine 73 is supported by a vertically slidable plate 76 mounted in the table top 40 the upper edge of which engages against the under side of a laterally projecting lug 77 provided at one side of the magazine 73 at the front end thereof, as clearly shown in Figs. 4, 18 and 25. The plate 76 is secured to the table top 40 by means of screws 78 which pass through elongated slots 78' provided in the plate 76, the arrangement being such that, upward rocking of the front end of the wrapper magazine may be effected by vertically moving said plate 76. Such movement of the plate 76 is secured through a rocker arm 79 the lower or outer end of which engages against the lower edge of said plate. Said rocker arm 79 is fixed to a transversely extending shaft 80 which is rockingly mounted in suitable bearings, as shown in Figs. 25 and 26. Said shaft is rocked by means of a rocker arm 81 the outer end of which is connected with a link 82 which carries a roller 83 engaging a cam groove 84 provided in one side of a cam disk 85 which is fixed to the shaft 42. Said cam groove is of such formation that, upon rotation of the shaft 42, the link 82 will be reciprocated to cause oscillation of the arm 81, the end of said link bearing the roller 83 being longitudinally slotted for engagement with the shaft 42 in order to utilize the latter in maintaining said end of said link in operative position, as will be readily understood. The rocker arm 81 is operatively connected with a collar 86 splined to the shaft 80, by means of a conventional pawl-and-ratchet mechanism 86', the arrangement being such that, upon oscillation of said arm 81, the shaft 80 will be rotated in only one direction or in such a direction as to cause upward rocking of the arm 79 to effect intermittent elevation of the plate 76 and hence of the forward end of the wrapper mechanism 73. In the operation of the machine, the arm 79 will be rocked downwardly by gravity. By splining the collar 86 to the shaft 80, the operative connection between the rocker arm 81 and said shaft may be broken by simply moving said collar longitudinally upon said shaft to such an extent as to move the ratchet formed upon said collar out of operative relation with the pawl which is mounted upon said arm 81.

Arranged below the wrapper magazine 73 is a pasting mechanism, the forward end of the table top 40 being cut away in order to receive said pasting mechanism. Said pasting mechanism comprises a tank 87 which is removably supported in position by channel members 88 provided at the lateral walls thereof which slidably engage flanges 89 provided at the adjacent edges of the opening of the table top, as clearly shown in Figs. 4 and 18. Mounted in the tank 87 is a roller or cylinder 90 through which extends a square shaft 91, one end of said shaft 91 projecting laterally through the corresponding edge portion of the table top to permit of removal of said shaft when it is desired to release the tank 87 so as to permit of removal thereof, as will be readily understood, said shaft being held in position through friction. The arrangement is such as will be observed by reference to Fig. 33 that, upon removal of said shaft the tank 87 will be free for outward sliding upon the supporting flanges 89. Rotation of the roller 90 is secured through a sleeve 92 which surrounds said laterally projecting end of said shaft, said sleeve being locked against relative rotary movement upon said shaft by reason of the opening therethrough conforming with the square formation of said shaft. Nuts 93 coöperate with the sleeve 92 to hold the same against relative longitudinal movement. Arranged at the inner end of the sleeve 92 is a gear 94 fixed to the hub 95 of a rocker arm 96, said hub being loosely mounted upon said sleeve. Provided at the outer end of the arm 96 is a spring-pressed pawl 97 adapted for engagement with a ratchet 98 formed upon the periphery of a collar 99 which is splined to said sleeve, as shown. The arrangement is such, as will be observed, that upon oscillation of the gear 94 the arm 96 will be correspondingly oscillated to cause intermittent rotation of the collar 99 and hence the sleeve 92, shaft 91 and roller 90. By sliding the collar 99 upon the sleeve 92 to such an extent as to position the ratchet 98 out of operative relation with the pawl 97 the operative connection between the arm 96 and the roller 90 may be broken, and so that during operation of the machine, cessation of operation of said roller may be effected by simply sliding the collar 99 as mentioned. A shifting fork 100 fulcrumed at 101 coöperates with said collar for moving the same into or out of operative position.

Oscillation of the gear 94 to effect intermittent rotation of the paste roller 90, as described, is secured through a rack formed at the under side of one of two bars 102 which are slidably mounted in elongated grooves or channels 103 formed at the inner sides of the frame members 75. Said rack meshes with the gear 94 whereby, upon reciprocation of the members 102, said gear will be oscillated as desired. The members 102 at the opposite sides of the machine are connected, as clearly shown in Figs. 19 and 20, by a transversely extending plate 104 the respective extremities of which are rigidly connected to said members 102.

In the operation of the machine the under side of the forward edge portion of the lowermost of the wrappers B arranged in the magazine 73 will normally project through the outlet opening 73' at the front end of the magazine into contact with the upper side of the paste roller 90, and so that upon rotation of said roller as just described, paste will be applied to said forward edge portion of the lowermost wrapper. A gage 87' arranged at the upper edge of the paste tank 87 coöperates with the roller 90 to control the quantity of paste which is carried by the periphery of said roller in the rotation thereof. Disengagement of said edge of said wrapper from said roller in order to permit of the engagement thereof by the gripping mechanism to be hereinafter described, is secured through the employment of a rectangular wire member 105 the opposite parallel side portions of which are slidably mounted in guide loops 106 which are secured upon the under side of the magazine 73. Said member 105 is so arranged that, upon forward movement thereof, the front transverse bar portion of said member will pass between the front edge portion of the lowermost wrapper B and the roller 90 and force said edge portion of said wrapper from engagement with the periphery of said roller. Reciprocation of said wrapper disengaging member as mentioned is effected by means of a lever 107 fulcrumed intermediate its extremities to the under side of the magazine 73 at 108. One end 109 of the lever 107 is bifurcated for engagement with a pin 109' provided at the rearward end of the member 105 and so that upon oscillation of said lever said member 105 will be reciprocated. The opposite end of the lever 107 engages a slot 110 provided in a plate 111 which is slidably mounted upon the adjacent side of the table top 40, being secured in position by screws 112 which engage elongated slots in said plate, as clearly shown in Figs. 23 and 24. The arrangement is such, that upon reciprocation of said plate 111, the lever 107 will be oscillated to cause operative movement of the member 105. Projecting from the plate 111, as clearly shown in Figs. 18 and 23 is a stud 113, the adjacent side of the table top 40 being provided with an elongated slot 114 to permit of the passage of said pin. Said pin is engaged by the outer end of a rocker arm 115 which is fixed to a shaft 116 mounted in suitable bearings 117, the outer end of said arm 115 being provided with an elongated slot for engagement with the pin 113, so that upon oscillation of said arm said pin and hence the plate 111 will be reciprocated. 116 is an arm 118 with the outer end of cated. Loosely mounted upon the shaft which is connected a link 119, said link, as clearly shown in Fig. 23, carrying a roller 120 which engages a cam groove 121 provided in one side of a cam disk 121' secured to the shaft 42. The arrangement is such that, upon rotation of the shaft 42, the link 119 will be reciprocated to cause oscillation of arm 118, the end of said link bearing the roller 120 being longitudinally slotted for engagement of the shaft 42 in the same manner and for the same purpose as other links heretofore described. Splined to the shaft 116, as shown in Fig. 18, is a collar 122 which is operatively connected with the rocker arm 118 by means of a conventional pawl-and-ratchet mechanism 123, the arrangement being such, that, upon oscillation of arm 118, as just mentioned, the shaft 116 will be intermittently moved in one direction to cause operative or forward movement of the wrapper disengaging member 105. A helical tension spring 124 coöperates with the plate 111 to effect retrograde movement thereof and hence of the member 105. By splining the collar 122 upon the shaft 116, as mentioned, the operative connection between the arm 118 and said shaft may be broken by sliding said collar to move the ratchet formed thereon out of registration with the pawl which is carried by said arm, in the same manner as above described relative to the vertical movement of the front end of the wrapper magazine and the rotation of the paste roller. A switch fork 125 fulcrumed at 126 coöperates with the collar 122 for sliding the same into or out of operative position.

Arranged at the inner end of the package receiving trough is an oscillatory blade 127 the respective extremities of the stem 128 of which are mounted in bearings provided at the upper edges of the trough side members 57, as clearly shown in Fig. 18. Coöperating with the blade 127 are helical tension springs 129 which are so arranged as to serve to normally hold the blade 127 in depending vertical position. Said blade is so positioned that packages passing through the trough will engage against the former and cause the same to be rocked upwardly to substantially horizontal position against the influence of the springs 129, as clearly shown in Figs. 1, 2 and 4. The arrangement is such that in use, the blade 127 will be normally held in elevated position by reason of the presence of packages in the receiving trough, and that upon the exhaust of the supply of packages in said trough, said blade will be swung downwardly under the influence of the springs 129. Provided at the respective ends of the stem 128 are cranks 130 and 131. The crank 130 is connected by means of a link 132 with one end of a bell crank lever 133 which is fulcrumed at 134, as clearly shown in Figs. 18 and 33, the opposite end of said bell crank lever being connected by means of a link 135 with the switching fork 100. The arrangement is such that, upon downward rocking of the blade 127, as just mentioned, the incidental rocking of the crank 130 will cause oscillation of the switching fork 100 to move the collar 99 to inoperative position and thus break the operative connection between the driving mechanism of the machine and the paste roller 90. The crank 131 is similarly connected by means of a link 136 with a bell crank lever 137 which is fulcrumed at 138, as clearly shown in Figs. 25 and 26. Said bell crank lever is connected by means of a link 139 with a shifting fork 140 which engages with the collar 86. The arrangement is such that, upon downward rocking of the blade 127 as mentioned, the incidental movement of the crank 131 will effect oscillation of the fork 140 to cause shifting of the collar 86 to inoperative position and hence to destroy the operative connection between the driving mechanism of the machine and the plate 76 which is adapted to impart vertical movement to the front end of the wrapper magazine. The outer end of the crank 131 projects into engagement with the lowermost of the slots 78' provided in said plate 76. The lower end portion of said slot is provided with a notch 78" as shown in Fig. 25 to permit of oscillation of the crank 131, said crank being permitted to rock under the influence of the blade 127, as mentioned, only when the plate 76 is at its upper terminal of movement, in which position of said plate, notch 78'' will register with crank 131. With said crank engaging said notch, plate 76 and hence magazine 73 will be locked at their upper terminals of movement, preventing contact of the wrappers with the paste roller.

The crank 131 is also connected by means of a link 141 with a bell crank lever 142 fulcrumed at 143 as shown in Figs. 18, 23 and 26. The bell crank lever 142 is connected by means of a link 144 with the shifting fork 125 whereby said fork will be operated to cause shifting of the collar 122 to inoperative position upon downward rocking of the blade 127. With this arrangement then it will be seen that, upon the supply of packages in the machine becoming exhausted, the mechanism which is instrumental in withdrawing the wrappers for application to the packages and which is instrumental in applying the paste to said wrappers will be automatically stopped although the remainder of the machine still continues to operate.

The wrapper withdrawing mechanism comprises a gripping device arranged at the under side of the transversely extending plate 104, as clearly shown in Figs. 4, 19 and 20. Said gripping device comprises coöperating jaws 145 and 146, said jaws being provided with rearwardly projecting fingers 145' and 146' respectively which pivotally engage a transversely extending rod 147 mounted at the under side of plate 104. Opening movement of the jaws 145 and 146 is secured through the medium of a transversely extending bar 148 which is rockingly mounted in bearing members 149 formed at the under sides of the fingers 145', as clearly shown in Figs. 4 and 22. The bar 148 is provided at its ends with cranks adapted for engagement against the under sides of the fingers 146', the arrangement being such that, when said bar is oscillated, the engagement of said cranks against the under sides of the fingers 146' will cause the latter to be swung upwardly and hence the jaw 146 to be correspondingly moved upwardly into operative relation with the jaw 145, as clearly shown in the figures above referred to. Also, the arrangement is such that, when the bar 148 is rocked in the opposite direction the cranks thereof will move from engagement with the under sides of the fingers 146' and permit the jaw 146 to move downwardly to open position by gravity. The respective extremities of the bar 148 engage upon the inclined upper edges of guide bars 148', the latter thus serving as a means of retaining the jaw members in proper elevated positions for engagement with the forward edge of the lowermost wrapper in the wrapper magazine, when said jaw members are moved toward the same.

Actuation of the bar 148 is effected through the medium of a rocker arm 150 secured to the member 148 medially of the ends thereof. The arm 150 is connected at its lower or free end with a rearwardly projecting operating bar 151, longitudinal movement of the bar 151 causing corresponding movement of the plate 104 and hence of the bars 102 to effect operation of the paste roller as above described. The arrangement is such that, upon forward movement of the bar 151 in order to effect actuation of the paste roller 90, the bar 148 will be rocked in such a direction as to effect release of the fingers 146' to permit of downward or opening movement of the jaw 146, as above mentioned, and, upon rearward or return movement of the bar 151, the arm 150 will cause rocking of the member 148 to rock the fingers 146' upwardly and hence to move the jaw 146 into operative relation with the jaw 145. Hence, with the construction set forth, it will be seen that opening of the gripping mechanism is automatically effected upon forward movement of the bar 151, and closing of said mechanism secured upon rearward or return movement of said bar. A stop 152 secured to the bar 151 is adapted to engage against the under side of the plate 104 to serve to limit rocking movement of the arm 150.

The amplitude of reciprocation of the gripping jaws 145 and 146 is such that, when said jaws are at their forward terminal of movement, the same will be adapted to engage the forward edge of the lowermost wrapper B arranged in the magazine 73. The machine is so adjusted that in operation the wrapper disengaging member 105 will be moved to disengage the forward edge of the lowermost wrapper, as above described, just before the gripping jaws arrive at their forward terminal of movement. Also, the mechanism is so timed that the upward rocking of the forward end of the magazine 73 occurs just before the disengagement by the member 105 of the forward edge of the lowermost wrapper, this upward rocking of the magazine serving to elevate the forward edges of the other wrappers B from engagement with the corresponding edge of the lowermost wrapper, and so that, when the latter is released from the paste roller by the disengaging mechanism 105, said forward edge thereof will be positioned substantially medially between the periphery of the paste roller and the forward edges of the remaining wrappers in the magazine so as to permit of ready engagement thereof by the gripping jaws 145 and 146. Said gripping jaws remain in open position, as above described, until the same reverse their movement, at which time said jaws, in moving to closing position, engage the forward edge of the lowermost wrapper to cause withdrawal thereof from the magazine when said jaws are moved from said magazine. The cam groove 84 in the cam 85 is so formed as to effect release of the forward end of the magazine 73 and hence downward movement thereof immediately upon the withdrawing movement of the gripping jaws and so that in the withdrawing of the wrapper, the under side of the latter will contact with the periphery of roller 90 which will apply paste thereto as will be readily understood.

If it is desired to apply paste to only the end portions of the under side of the wrapper instead of to the entire surface such as is the case where a cam having a cam groove of the shape of the groove 84 is employed, a cam 85' having a cam groove 84', as shown in Fig. 27, may be used. The cam groove 84' is so formed as to cause the front end of the magazine 73 to be held in elevated position until the wrapper is almost completely removed when said end of said magazine will be lowered. This being so paste will be applied to only the front and rear edge portions of the wrapper, none being applied to the central portion thereof or while the front end of the magazine is in elevated position.

The wrapper B which is withdrawn by the gripping mechanism from the wrapper magazine is carried to the position shown in Fig. 4 directly over the package A which is positioned upon the flange 65 of the package elevating member 64 and so that, upon further upward movement of the package by said member 64, the wrapper will be folded over the two sides thereof through contact of the rollers 72 and 72' with the wrapper. The package will be momentarily held elevated by the flange 65 in position directly above the rollers 72 and 72' until a transversely extending plate 153 engages against the front face of the package to effect advancing thereof along the table to complete the folding of the wrapper about the package. The plate 153 is provided at its lower edge with a flange 153' which is adapted upon operative movement of said plate to engage the edge portion $a$ of the wrapper and cause the same to be folded against the corresponding edge portion of the under face of the package as clearly shown in Fig. 34. The plate 153 is carried by a transversely extending bar 154 the respective ends of which are secured to bars 155 which are slidably mounted in longitudinally extending grooves 156 provided at the inner sides of the guide members 75. Reciprocation of the bars 155 is secured by links 157 which are connected with arms 158 which are fixed to the shaft 51, the arrangement being such that, upon oscillation of the shaft 51 such as is caused through reciprocation of the link 52 by means of the cam 55, said arms 158 will be oscillated to cause actuation of the bars 155, as will be readily understood.

In the operative movement of the plate 153 the package will be moved over the roller 72' and slid onto the upper sides of longitudinally extending supporting strips or bars 159. In the passage of the package over the roller 72' edge portion $b$ of the wrapper will be folded into engagement with the under side of the package, as clearly shown in Fig. 34, the package being advanced by the plate 153 to a position substantially centrally upon the supporting members 159.

The rearward end of the bar 151 is pivotally connected with a transversely extending bar 160, as clearly shown in Figs. 19, 20 and 21. The transversely extending bar 160 serves as a yoke which connects longitudinally extending bars 161 which are mounted for slight longitudinal movement at the under side of a plate 162 which is mounted for reciprocatory movement between channel guides 163, the guides 163 being supported upon supporting brackets 163' mounted upon the table top 40. Carried by the plate 162 are two sets of engaging fingers 164 which are pivoted at 165 in slots 164' provided in said plate. The lower ends of the fingers 164 are connected with bars 161, the arrangement being such that, through longitudinal movement of said bars, said fingers may be swung to vertical position as shown, or to horizontal position in the slots 164'. Reciprocation of the plate 162 is secured by a link 166 which is connected at its rearward end with the outer extremity of a rocker arm 167 secured to a shaft 168 mounted in suitable bearings 168' depending from the table top 40. The shaft 168 is rocked by an arm 169 which is connected with one end of a link 170, the opposite end of said link being provided with a roller 171 which engages a cam groove 172 provided in a cam disk 173 which is fixed to the shaft 42, as clearly shown in Figs. 4 and 5. The arrangement is such that, upon rotation of the cam disk 173, the shaft 168 will be oscillated to cause corresponding rocking of the arm 167 and hence reciprocatory movement of the plate 162. The connection of the bars 161 with the fingers 164 is such that, upon movement of the link 166 to effect sliding of the plate 160 toward the left, said fingers 164 will be rocked downwardly to horizontal or inoperative position, and that, upon return movement of the former, said fingers will be automatically rocked to vertical or operative position as shown in Fig. 20. The amplitude of reciprocation of the plate 162 is such that, when said plate commences return sliding from its left hand terminal of movement, the fingers 164 at the left hand end of said plate will rock to operative position behind the package positioned upon the supporting members 159 and which package has been advanced to its position by the plate 153, as above described, and cause further advancing of said package when the plate 162 moves toward the right, the package after leaving the supporting members 159 sliding onto the upper sides of the channel members 163. Further, the amplitude of reciprocation of the plate 162 is such that in the succeeding actuation thereof the package which has been advanced by the fingers 164 at the left hand end of said plate will be engaged by the fingers 164 at the opposite end of the plate and still further advanced thereby. Thus in the operation of the machine each package is intermittently advanced through the machine by engagement therewith, first of the plate 153, second by the set of fingers 164 at the left hand end of the plate 160, and third by the set of fingers 164 at the opposite end of said plate, the positions to which the packages are progressively advanced by said sets of fingers being indicated in dotted lines in Fig. 20.

Arranged at the under side of the plate 162 at the right hand end thereof is a rod 174 which is slidably mounted in depending lugs 175 and 175'. A helical compression spring 176 interposed between the lug 175' and a stop 177 secured to said rod serves to normally hold the latter at its right hand terminal of movement or with the stop 177 engaging against the lug 175. Coöperating with the rod 174, as clearly shown in Fig. 20 is a stop lug 178 against which the corresponding end of the rod 174 is adapted to engage to move the stop 177 from engagement with the lug 175 and hence to compress the spring 176 when the plate 162 is at its right hand terminal of movement. With this arrangement, when the rod 166 is moved toward the left, during the operation of the machine, the spring 176 will cause the plate 162 to be correspondingly moved under the tension of said spring until the stop 177 engages against the lug 175 when the tension of said spring will be overcome by friction effecting slight relative movement of the bars 161 and hence rocking of the fingers 164 to lowered or inoperative positions. This construction is adopted in order to prevent marring of the surfaces of the wrappers which are engaged by said fingers 164, it being clear that without this provision upon movement of the rod 166 to the left in order to effect forward reciprocation of the plate 162, the fingers 164 would scrape the sides of the wrappers engaged thereby in the rocking of said fingers to inoperative positions, and thus cause marring or injury of the surfaces of the wrappers. With the construction employed the possibility of such marring is obviated.

Arising from the table top 40 opposite the point to which the package is advanced by the left hand set of engaging fingers 164 are brackets or supports 179. Fulcrumed at 180 at the upper end of each of said supports is a pair of folding levers 181 and 182. Pivotally mounted at the outer ends of the levers 181 and 182 are shoes or contact plates 183 with which coöperate leaf springs 184 which serve to normally hold said shoes or plates in engagement with stops 185 as clearly shown in Figs. 10, 11 and 12. The arrangement is such that, upon inward rocking of the levers 181 and 182, the contact plates 183 will engage with the laterally projecting edge portions of the wrapper of the package arranged in registration with said levers, and, cause the upper and lower portion c of said edges to be folded into engagement with the corresponding end faces of the package, as clearly shown in Fig. 35. Oscillation of the levers 181 and 182 is effected by means of rods 186 which depend from said levers, engaging at their lower ends with a rocker arm 187 fixed to a shaft 188 which is mounted in suitable bearings 189 provided at the under side of the table top 40, as clearly shown in Figs. 3, 5, 10 and 32. The shaft 188 is oscillated through the medium of an arm 190 which is connected to one end of a link 191, the opposite end of said link carrying a roller 192 which engages a cam groove 193 provided in one side of a cam 194 secured to the shaft 42, the last mentioned end of said link being slotted for engagement with the shaft 42 in the same manner and for the same purpose as similar links heretofore described. The arrangement is such that, upon rotation of the cam disk 194, the movement which is imparted to the link 191 will cause oscillation of the levers 181 and 182 in the desired manner.

Arranged upon the table top 40 at opposite sides thereof in registration with the position to which the package is advanced by the engaging fingers 164 at the right hand end of the plate 162, as above described, are paste tanks 195, as clearly shown in Figs. 13 to 16 inclusive. The tanks 195 are removably held in position by flanges 196 which engage with laterally projecting flanges provided at the bases of said tanks. A key 197 coöperates with each of the tanks 195 to releasably lock the same in operative position, said key being adapted to engage a socket 198 provided in the upper side of the table top. The arrangement is such, as will be seen, that upon release of said keys from the sockets engaged thereby said tanks may be slid laterally to disengagement to permit of ready cleansing thereof. At the outer ends of said tanks are provided handles 199 which facilitate handling thereof, and at the upper sides of said tanks are provided cover plates 200. Rotatably mounted in each of the tanks 195 is a pair of disks 201 secured to a shaft 202 having bearings in the side walls of said tanks as shown. The disks 201 are so arranged that, when in operation, the lower portions thereof will dip into the paste arranged in the tanks, some of the paste adhering thereto for transferring from the upper portions of said disks to blades 203 which are arranged adjacent thereto. The blades 203 are secured to shafts 204, said blades being oscillated through actuation of said shaft 204. The blades 203 are so arranged that when oscillated inwardly corresponding sides of the outer end portions thereof will contact with the inner surfaces of the flaps d which are formed at the extremities of each package by folding of the portions c of the wrapper by the folding levers 181 and 182 as shown in Fig. 35, and thus apply paste to said sides of said flaps. The operative sides of said blades are preferably corrugated as shown in order to afford recesses in which paste will be retained in the contact of said blades with the disks 201.

Actuation of the blades 203 as mentioned is effected by bell crank levers 205 which are secured at their fulcrums to the shafts 204, one of the arms of each of the bell cranks 205 being connected by means of a link 206 with a rocker arm 207 which is fixed to the shaft 188, the arms 207 being preferably formed integral with arms 187. The opposite end of each of the bell crank levers 205 is connected by means of a link 208 with an arm 209 loosely mounted for rocking upon the corresponding shaft 202. A conventional pawl-and-ratchet mechanism 209' coöperates with each of the arms 209 to operatively connect the same with the corresponding shaft 202, the arrangement being such that, upon oscillation of said arm, the corresponding disk 201 will be intermittently rotated. With the arrangement then as disclosed, it will be seen that upon oscillation of the arms 207 through rocking of the shaft 188 the paste disks 201 will be intermittently rotated and the blades 203 simultaneously intermittently oscillated to cause the application of paste to the inner sides of the flaps d of the package arranged in registration therewith.

After the application of paste as mentioned to the flaps d, said flaps will be folded to position over the portions c of the wrapper, as shown in Fig. 36 to complete the wrapping of the package, by means of a pair of folding members 210 and 211 arranged for coöperation with each end of the package. The folding members 210 are secured to the lower ends of vertically extending shafts 212 which shafts are operatively connected through bevel gears with a transversely extending shaft 213, said shafts being mounted in a supporting frame 214, as clearly shown in Figs. 3, 5 and 13. The folding members 211 are carried as shown by the shaft 213 being adapted to move in vertical planes when said shaft is oscillated, the folding members 210 being adapted, as will be observed for movement in a horizontal plane. The arrangement is such, that, upon oscillation of the shaft 213 the outer ends of the folding members 210 and 211 will engage the flaps c of the package arranged in registration therewith and fold the same to the positions shown in Fig. 36, in which positions said flaps will be retained by reason of the adhesive provided upon the inner or rearward sides thereof.

Oscillation of the shaft 213 as mentioned is effected by a link 215 which engages at its upper end with the outer end of a rocker arm 215' secured to said shaft, the lower end of said link being connected with one end of a bell crank lever 216 which is fulcrumed at 217 at the under side of the table top 40. The other end of said bell crank lever is connected with one end of a link 218, the opposite end of said link carrying a roller 219 which engages a cam groove 220 provided in one side of a cam disk 221 which is fixed to the shaft 42, as clearly shown in Figs. 10 and 31, said last mentioned end of said link being provided with an elongated slot which engages with said shaft 42 in the same manner and for the same purpose as similar links heretofore described. With this arrangement, upon rotation of the cam disk 221 the shaft 213 will be oscillated to effect the desired actuation of the folding members 210 and 211.

After the completion of the folding operation of a wrapper about a package, as just described, the package will be advanced by engagement therewith of the immediately subsequent package, the packages at the outlet end of the machine being thus arranged side by side, the thrusting of a package into position by the fingers 164 at the right hand end of the plate 162 for final folding of the wrapper about the package, causing the entire line of packages arranged ahead of the same to be advanced.

After leaving the right hand ends of the channel members 163 upon which the packages are slid after leaving the guide members 159, said packages are engaged by the upper side of an endless belt 222 which is mounted for rotation about rollers 223 and 224 which are mounted between uprights 225. At the sides of the belt 222 are arranged endless belts 226 which are mounted for travel around rollers 227 and 228 which are also mounted in the uprights 225, the rollers 228 being operatively connected with the roller 224 by bevel gears as clearly shown in Fig. 7. The roller 224 is intermittently rotated through the medium of a rocker arm 229 the lower end of which is connected by means of a link 230 with a rocker arm 231 fixed to the shaft 168, as clearly shown in Fig. 3. The arm 229 is operatively connected with the shaft 224' of the roller 224 by means of conventional pawl-and-ratchet mechanism 232, the arrangement being such that, upon oscillation of the arm 229 such as is imparted thereto upon actuation of the shaft 168, the belt 222 and also the belts 226 will be intermittently driven to assist in the conveyance of the packages onto the discharge chute 233. Leaf springs 234, coöperate, as clearly shown in Fig. 6 with the inner sides of the belts 226 to normally force the same into yielding engagement with the opposite faces of the packages passing between the same in order to serve to effectually press the folds or flaps at the ends of the package into folded positions.

An elongated longitudinally extending plate 235 is movably suspended by pins 236 from supporting bars 237 extending substantially the entire length of the machine for contact with the packages from the time the same are thrust upwardly between the rollers 72 and 72' until the same are discharged onto the chute 233 in order to retain the packages in position in their passage through the machine and also in order to effectually press the upper side of each wrapper into engagement with the corresponding face of the package. Helical compression springs 238 surrounding the pins 236 coöperate with the plate 235 to yieldingly hold the same in contact with the packages as the same are passing through the machine. In the operation of the machine then, it is only required to introduce the packages into the receiving trough onto the belt 46. This being done the packages will be conveyed by said belt inwardly toward the guide plate 63 whence the packages will be elevated one at a time by the vertical reciprocation of the elevating member 64. During the vertical movement of the elevating member 64 a wrapper will be withdrawn from the wrapper magazine by the gripping jaws 145 and 146, paste being applied to the under side of the wrapper in the withdrawing operation by contact with the periphery of the pasting roller 90. The forward edge of the gripping jaw 145 projects beyond the corresponding edge of the jaw 146 to a considerable extent, as clearly shown in Figs. 4 and 20. The jaw 145 protrudes in this manner in order to serve as a stop, the same, in the forward movement of the gripping jaws serving as a stop to limit the upward movement of the forward edge of the lowermost wrapper when the latter is disengaged from the paste roller through the disengaging mechanism 105. The mechanism will, of course, be so timed that the disengagement of the forward edge of the lowermost wrapper will occur just when the forward edge portion of the jaw 145 is positioned thereover and so that when said edge of the wrapper is disengaged, it will automatically move upwardly into contact with said jaw and thus insure gripping of said edge of said wrapper when the gripping jaws are advanced to their forward terminals of movement. The wrapper is withdrawn by the gripping jaws 145 and 146 to position over the package elevated by the elevating member 64 and so that when the package is thrust upwardly between the rollers 72 and 72' the wrapper arranged above the same will be folded over the top face of the package and against the front and rear faces thereof, the rollers 72 and 72' pressing the wrapper into contact with the last mentioned faces of the package. The package is moved upwardly by the elevating mechanism until the same contacts with the plate 235. The package will be momentarily held in this position until the plate 153 is moved into engagement therewith, the flange 153' at the lower edge of the plate 153, during this movement of the latter, causing the folding of the edge portion $a$ of the wrapper into engagement with the adjacent edge portion of the under face of the package. The package is moved by the plate 153 over the roller 72' onto the guide members 159, the roller 72' in this movement pressing the edge portion $b$ of the wrapper into engagement with the under face of the package covering the edge portion $a$ as shown in Fig. 34. The plate 153 carries the package to a position substantially medially upon the members 159 whence the package is conveyed by the fingers 164 at the left hand end of the plate 162 to position opposite the folding levers 181 and 182. When this position is reached the contact members or shoes 183 provided at the outer ends of the levers 181 and 182 are moved into engagement with the upper and lower portions of the projecting edges of the wrapper causing the folding of said edges, designated as $c$ in Fig. 35, to engagement with the adjacent faces of the package. This being done the package is advanced by the fingers 164 arranged at the opposite end of the plate 162 to position in registration with the paste tanks 195 and the folding members 210 and 211. When this position is reached paste will be applied to the inner sides of the flaps $d$ which were formed at the extremities of the package by folding of the portions $c$, the paste being applied by the blades 203. After the application of paste to the inner sides of said flaps, the same will be folded into position over the portions c of the wrapper by the folding members 210 and 211. Thus the folding of the wrapper about the package is completed, the travel of the package through the remaining portion of the machine effecting merely the pressing of the wripper into secure engagement with the faces of the package. It is understood of course that the levers are so proportioned and mounted and connected and the various cam grooves so formed as to properly time the different operations as mentioned.

Upon the exhaust of packages supplied to the machine for wrapping, cessation of operation of the mechanism instrumental in the removal or withdrawal of wrappers from the wrapper magazine and in the application of paste to the wrappers, will be automatically effected through the downward rocking of the blade 127 which is released upon the last package being elevated to the table by the elevating member 64. The waste of wrappers is thus prevented together with the incidental discharge of the same to interfere with the operation of other parts of the machine. If desired the mechanism for preventing cessation of operation of the paste roller 90, or actuation of the wrapper-disengaging member 105 and of the mechanism which effects vertical reciprocation of the plate 76 may be dispensed with and the crank 131 which engages with the notch 78'' of the plate 76 to lock the latter, and hence the forward end portion of the wrapper magazine at their upper terminals of movement, relied upon to prevent the withdrawal of wrappers from the wrapper magazine, it being clear that, when said end of said wrapper magazine is at its upper terminal of movement the forward edge portions of the wrappers contained therein will be held out of engagement with the paste roller and out of range of the wrapper-gripping jaws.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a wrapping machine the combination of a table upon which packages to be wrapped are adapted to travel; means for delivering packages to said table at one end thereof; a wrapper magazine; means for withdrawing a wrapper from said magazine for application to each of the packages delivered to said table; means for applying an adhesive to the side of the wrapper adapted to contact with the package; means for applying the wrapper to all except the lateral faces of the package leaving the lateral edges of the wrapper projecting beyond the corresponding faces of the package; means for advancing the packages upon said table; means for folding the upper and lower portions of the projecting edges of said wrapper into engagement with the corresponding end faces of the package; means for applying adhesive to the inner sides of the projecting flaps formed at the vertical edges of the ends of the package upon folding of said upper and lower portions of said lateral edges of said wrapper; and means for folding said flaps over the before folded edge portions of the wrapper, substantially as described.

2. In a wrapping machine the combination of a table upon which packages to be wrapped are adapted to travel; means for delivering packages to said table at one end thereof; a wrapper magazine; means for withdrawing a wrapper from said magazine for application to each of the packages delivered to said table; means for applying an adhesive to the side of the wrapper adapted to contact with the package; means for applying the wrapper to all except the lateral faces of the package leaving the lateral edges of the wrapper projecting beyond the corresponding faces of the package; means for advancing the packages upon said table; means for simultaneously folding the upper and lower portions of the projecting lateral edges of said wrapper into engagement with the corresponding end faces of the package; means for applying adhesive to the inner sides of the projecting flaps formed at the vertical edges of the ends of the package upon folding of said upper and lower portions of said lateral edges of the wrapper; and means for folding said flaps over the before folded edge portions of the wrapper, substantially as described.

3. In a wrapping machine the combination of a table upon which packages to be wrapped are adapted to travel; means for delivering packages to said table at one end thereof; a wrapper magazine; means for withdrawing a wrapper from said magazine for application to each of the packages delivered to said table; means for applying an adhesive to the side of the wrapper adapted to contact with the package; means for applying the wrapper to all except the lateral faces of the package leaving the lateral edges of the wrapper projecting beyond the corresponding faces of the package; means for advancing the packages upon said table; means for folding the upper and lower portions of the projecting edges of said wrapper into engagement with the corresponding end faces of the package; means for applying adhesive to the inner sides of the projecting flaps formed at the vertical edges of the ends of the package upon folding of said upper and lower portions of said lateral edges of said wrapper; and means for successively folding said flaps over the before folded edge portions of the wrapper, substantially as described.

4. In a wrapping machine the combination of a table upon which packages to be wrapped are adapted to travel; means for delivering packages to said table at one end thereof; a wrapper magazine; means for withdrawing a wrapper from said magazine for application to each of the packages delivered to said table; means for applying an adhesive to the side of the wrapper adapted to contact with the package; means for applying the wrapper to all except the lateral faces of the package leaving the lateral edges of the wrapper projecting beyond the corresponding faces of the package; means for advancing the packages upon said table; means for simultaneously folding the upper and lower portions of the projecting lateral edges of said wrapper into engagement with the corresponding end faces of the package; means for applying adhesive to the inner sides of the projecting flaps formed at the vertical edges of the ends of the package upon folding of said upper and lower portions of said lateral edges of the wrapper; and means for simultaneously folding said flaps over said before folded edge portions of the wrapper, substantially as described.

5. In a wrapping machine, the combination of a package guiding mechanism; means for delivering packages to said guiding mechanism; a wrapper magazine; means for withdrawing a wrapper from said magazine for application to each of the packages delivered to said guiding mechanism; means for applying the wrapper to all except the lateral faces of the package leaving the lateral edges of the wrapper projecting beyond the corresponding faces of the package; means for advancing the packages in said guiding mechanism; means for folding the upper and lower portions of the projecting edges of said wrapper into engagement with the corresponding lateral faces of the package; means for applying adhesive to the inner sides of the projecting flaps formed at the vertical edges of the lateral faces of the package upon folding of said upper and lower portions of said lateral edges of said wrapper; and means for folding said flaps over the before folded edges of the wrapper, substantially as described.

6. In a wrapping machine, the combination of a package guiding mechanism; means for delivering packages to said guiding mechanism; a wrapper magazine; means for withdrawing a wrapper from said magazine for application to each of the packages delivered to said guiding mechanism; means for applying the wrapper to all except the lateral faces of the package leaving the lateral edges of the wrapper projecting beyond the corresponding faces of the package; means for advancing the packages in said guiding mechanism; means for folding the upper and lower portions of the projecting edges of said wrapper into engagement with the corresponding lateral faces of the package; means for applying adhesive to the inner sides of the projecting flaps formed at the vertical edges of the lateral faces of the package upon folding of said upper and lower portions of said lateral edges of said wrapper; and means for successively folding said flaps over the before folded edges of the wrapper, substantially as described.

7. In a wrapping machine, the combination of a package guiding mechanism; means for delivering packages to said guiding mechanism; a wrapper magazine; means for withdrawing a wrapper from said magazine for application to each of the packages delivered to said guiding mechanism; means for applying the wrapper to all except the lateral faces of the package leaving the lateral edges of the wrapper projecting beyond the corresponding faces of the package; means for advancing the packages in said guiding mechanism; means for simultaneously folding the upper and lower portions of the projecting edges of the wrapper into engagement with the corresponding lateral faces of the package; means for applying an adhesive to the inner sides of the projecting flaps formed at the vertical edges of the lateral faces of the package upon folding of said upper and lower portions of said lateral edges of said wrapper; and means for folding said flaps over the before folded edge portions of the wrapper, substantially as described.

8. In a wrapping machine, the combination of package guiding mechanism; means for delivering packages to said guiding mechanism; means for supplying a wrapper for application to each of the packages delivered to said guiding mechanism; means for applying the wrapper to all except the lateral faces of the package leaving the lateral edges of the wrapper projecting beyond the corresponding edges of the package; means for advancing the packages in said guiding mechanism; means for folding the upper and lower portions of the projecting edges of said wrapper into engagement with the corresponding lateral faces of the package; means for applying adhesive to the inner sides of the projecting flaps formed at the vertical edges of the lateral faces of the package upon folding of said for delivering packages to said guiding mechanism; a wrapper magazine mounted to permit of vertical movement of one end thereof; means for withdrawing a wrapper from said magazine and delivering it into engagement with each package delivered to said guiding mechanism, withdrawal of wrappers from said magazine being prevented when said end of said magazine is at its upper terminal of movement; and movable means adapted normally to lock said magazine at its upper terminal of movement, packages positioned in said package delivering means moving said locking means to inoperative position, substantially as described.

15. In a wrapping machine, the combination of package guiding mechanism; means for delivering packages to said guiding mechanism; a wrapper magazine mounted to permit of vertical movement of one end thereof; means for withdrawing a wrapper from said magazine and delivering it into engagement with each package delivered to said guiding mechanism, withdrawal of wrappers from said magazine being prevented when said end of said magazine is at its upper terminal of movement; and oscillatory means adapted when in normal position to effect locking of said magazine at its upper terminal of movement, packages positioned in said package delivering means moving said locking means to inoperative position, substantially as described.

16. In a wrapping machine, the combination of package guiding mechanism; means for delivering packages to said guiding mechanism; a wrapper magazine mounted to permit of vertical movement of one end thereof; means for withdrawing a wrapper from said magazine and delivering it into engagement with each package delivered to said guiding mechanism, withdrawal of wrappers from said magazine being prevented when said end of said magazine is at its upper terminal of movement; and an oscillatory member mounted in proximity with said package delivering means adapted normally to effect locking of said magazine at its upper terminal of movement, packages positioned in said package delivering means moving said oscillatory member to inoperative position, substantially as described.

17. In a wrapping machine, the combination of package guiding mechanism; means for delivering packages to said guiding mechanism; a wrapper magazine mounted to permit of vertical movement of one end thereof; means for withdrawing a wrapper from said magazine and delivering it into engagement with each package delivered to said guiding mechanism, withdrawal of wrappers from said magazine being prevented when said end of said magazine is at its upper terminal of movement; an oscillatory member adapted to be held in operative position by packages positioned in package delivering means, said oscillatory member being adapted, upon exhaust of packages from said delivering means, to rock downwardly; and an operative connection between said oscillatory means and said magazine whereby, upon downward rocking of said member, said end of said magazine will be locked at its upper terminal of movement, substantially as described.

18. In a machine of the class described, the combination of a package guiding mechanism; means for periodically advancing the packages in said guiding mechanism, said last mentioned means comprising a reciprocatory member; guiding means movably mounted in said member adapted for engagement with the packages; means for actuating said engaging means whereby, when said reciprocatory member is moved in one direction, said engaging means will be in operative position, and when said member is moved in the opposite direction, said engaging means will be moved to inoperative position; and means adapted, upon the last mentioned movement of said member, to delay the movement of said engaging means to inoperative position until the same have been moved from engagement with the packages engaged thereby, substantially as described.

19. In a machine of the class described, the combination of a package guiding mechanism; means for periodically advancing the packages in said guiding mechanism, said last mentioned means comprising a reciprocatory member; engaging means movably mounted in said member adapted for engagement with the packages; means for actuating said engaging means whereby, when said reciprocatory member is moved in one direction, said engaging means will be in operative position, and, when said member is moved in the opposite direction, said engaging means will be moved to inoperative position; and a spring pressed plunger carried by said reciprocatory member adapted for coöperation with a stationary stop for delaying the movement of said engaging means to inoperative position until the same have been moved from engagement with the packages engaged thereby, substantially as described.

20. In a wrapping machine, the combination of package guiding mechanism; means for delivering packages to said guiding mechanism; means for supplying a wrapper for application to each of the packages delivered to said guiding mechanism, means for periodically advancing said packages in said guiding mechanism to permit of application of the wrappers thereto, said last mentioned means comprising a reciprocatory member; engaging means movably mounted in said member adapted for engagement with the packages; means for actuating said engaging means whereby, when said reciprocatory member is moved in one direction, said engaging means will be in operative position, when said member is moved in the opposite direction, said engaging means will be moved to inoperative position; and means adapted, upon the last mentioned movement of said member, to delay the movement of said engaging means to inoperative position until the same have been moved from engagement with the packages engaged thereby, substantially as described.

21. In a wrapping machine, the combination of package guiding mechanism; means for delivering packages to said guiding mechanism; means for supplying a wrapper for application to each of the packages delivered to said guiding mechanism; means for periodically advancing said packages in said guiding mechanism to permit of application of the wrappers thereto, said last mentioned means comprising a reciprocatory member; engaging means movably mounted in said member adapted for engagement with the packages; means for actuating said engaging means whereby, when said reciprocatory member is moved in one direction, said engaging means will be in operative position and, when said member is moved in the opposite direction, said engaging means will be moved to inoperative position; and a spring pressed plunger carried by said reciprocatory member adapted for coöperation with a stationary stop for delaying the movement of said engaging means to inoperative position until the same have been moved from engagement with the package engaged thereby, substantially as described.

In testimony whereof I have signed my name to this specification in the presence of two subscribing witnesses.

AXEL R. SCHOLIN.

Witnesses:
 ARTHUR A. OLSON,
 JOSHUA R. H. POTTS.